June 20, 1933.  H. JACKMAN  1,914,807
APPARATUS FOR FOLDING, BEATING, AND MIXING BATTERS
Filed Aug. 7, 1931   4 Sheets-Sheet 1
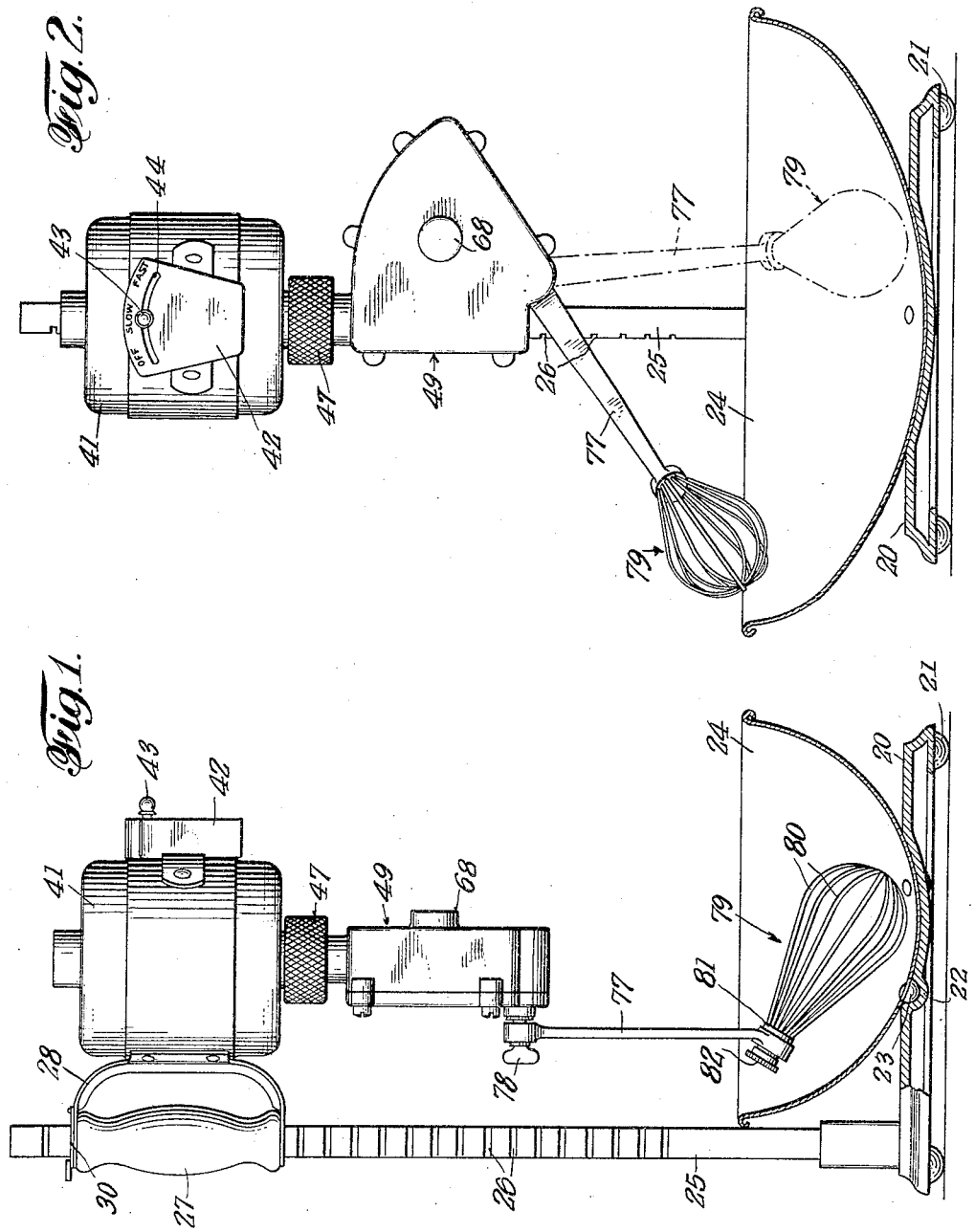
INVENTOR
*Hyman Jackman*
BY
Bernard Lemlein
his ATTORNEY June 20, 1933.  H. JACKMAN  1,914,807
APPARATUS FOR FOLDING, BEATING, AND MIXING BATTERS
Filed Aug. 7, 1931  4 Sheets-Sheet 2
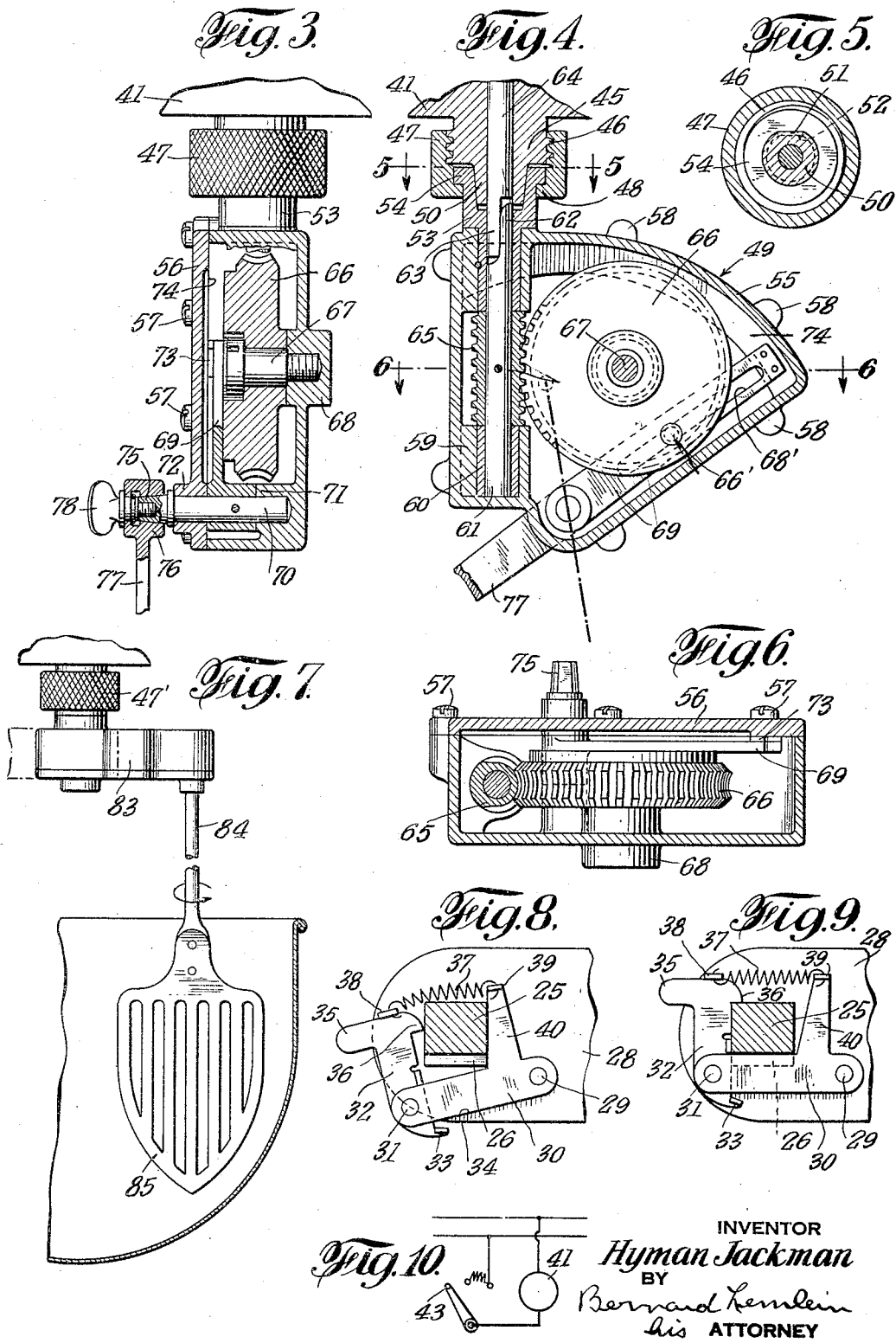
INVENTOR
Hyman Jackman
BY
Bernard Lemlein
his ATTORNEY

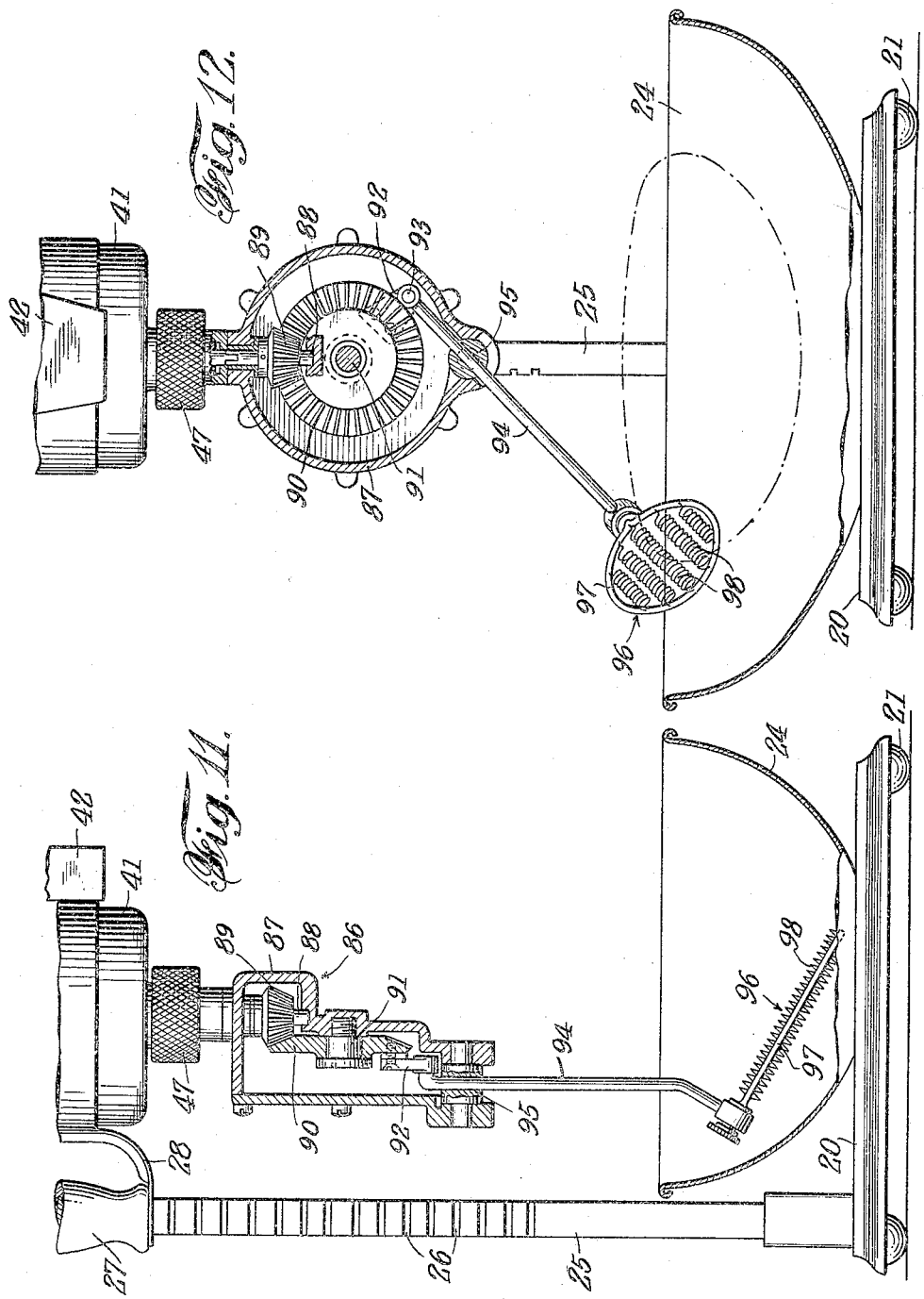

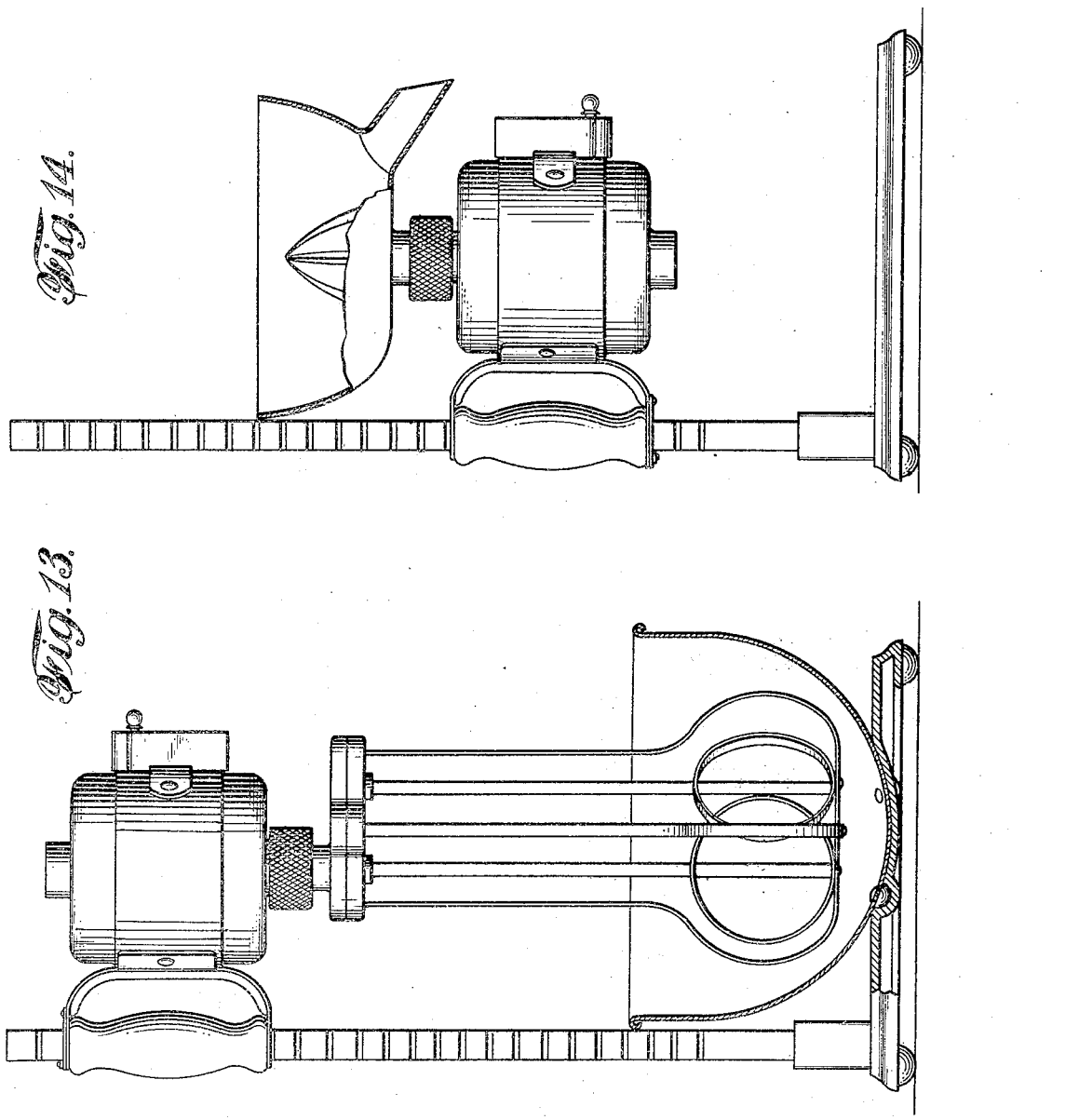

Patented June 20, 1933

1,914,807

UNITED STATES PATENT OFFICE

HYMAN JACKMAN, OF BROOKLYN, NEW YORK, ASSIGNOR TO PAULINE MARKS, OF NEW YORK, N. Y.

APPARATUS FOR FOLDING, BEATING, AND MIXING BATTERS

Application filed August 7, 1931. Serial No. 555,658.

My present invention relates to apparatus for folding, mixing and beating the ingredients of batters for cakes and the like and aims to devise devices of the general character specified, which are simple in construction, easy and economical to fabricate and assemble and admirably adapted to perform their intended functions as will hereinafter be set forth in considerable detail.

My invention also includes means for extracting juices from fruits and the like and means for mixing and beating the ingredients of ice cream and mousse mixtures.

While not limited to the folding of certain ingredients in batters for cakes and mixing and beating certain ingredients of ice cream and mousse mixtures, my invention is particularly designed for the purpose of carrying out these processes in an accurate, expeditious and highly desirable manner.

In the accompanying specification I shall describe and in the annexed drawings show several illustrative embodiments of the apparatus of the present invention. However, it is to be clearly understood that I do not wish to be limited to the exact details herein shown and described for purposes of illustration only.

Other objects and advantages of the present invention will be readily understood by those skilled in the art to which the present invention relates.

Before describing my invention in detail, I deem it advisable to briefly refer to the prior art in the field to which the present invention relates, the disadvantages thereof, and the manner in which the present invention overcomes such disadvantages.

Hitherto, in adding the yolks of eggs and flour to mixtures in the preparation of batters for cakes, it has been the custom to accomplish such mixing by means of a rotary motion with a spoon or hand beater or with that type of beater commonly known as the "Dover" rotary beater. I have discovered that by using such means for mixing the ingredients of a batter, certain disadvantages arise. The most important one is that mixing the ingredients by a rotary motion at high speed results in breaking up the air cells in the batter so that the texture of the final cake is coarse, uneven, rough and heavy. I have also discovered that if the yolks and the flour are added to the previous mixture in the preparation of the batter by folding the same into the previous mixture with a slow reciprocating motion, the air cells are not disturbed and as a result the final cake is of even, fine grain and delicate texture. It is by means of the present invention that the folding, reciprocating motion referred to is attained in an accurate manner so that cakes, the batters of which have been mixed by means of the apparatus of the present invention, are far superior in quality to those which it has been possible to prepare by existing methods of mixing the batters.

I have also discovered that in the preparation of ice cream and mousse mixtures, still another type of motion is necessary in order that the final frozen food product have a soft, velvety and creamy consistency. It is by means of the mixing and beating attachments of the present invention that it is possible to attain the proper substantially elliptical motion necessary to the preparation of ice cream and mousse mixtures in order to obtain a final product of the desired quality.

Referring to the accompanying drawings, Fig. 1 is a side elevational view of the aforesaid illustrative embodiment of the folding attachment of the present invention.

Fig. 2 is a front elevational view of the same.

Fig. 3 is a transverse sectional view taken substantially through the center of the reciprocating mechanism utilized in the aforesaid illustrative embodiment of the folding attachments of the present invention.

Fig. 4 is a longitudinal sectional view of the same.

Fig. 5 is a transverse sectional view taken on line 5—5 of Fig. 4.

Fig. 6 is a transverse sectional view taken on line 6—6 of Fig. 4.

Fig. 7 is a fragmentary elevational view of a mixing attachment constituting another of the aforesaid illustrative embodiments of the present invention.

Fig. 8 is a transverse sectional view showing the supporting means for the source of motive power employed in the aforesaid illustrative embodiments of the present invention, the same being shown in an open or inoperative position.

Fig. 9 is a diagrammatic view of the wiring for the motor.

Fig. 10 is a diagrammatic view illustrating the electrical hook-up preferably utilized in the aforesad illustrative embodiments of the present invention.

Fig. 11 is a partial side elevational, partial transverse sectional view of a beating and mixing attachment constituting another of the aforesaid illustrative embodiments of the present invention.

Fig. 12 is a longitudinal sectional view of the same.

Fig. 13 is a side elevational view of a beater attachment constituting still another illustrative embodiment of the present invention; and Fig. 14 is a partial longitudinal sectional, partial side elevational view of a juice extractor constituting the last of the aforesaid illustrative embodiments of the present invention.

Referring now more in detail to the folding attachment, constituting one of the aforesaid illustrative embodiments of the present invention, and with particular reference to Figs. 1 to 6 inclusive and 8 to 10 inclusive of the drawings illustrating the same, the numeral 20 designates a dish-shaped base or platform having at the four corners thereof, supporting feet 21 and in the center thereof, a plurality of depressions 22 receptive of detents 23 formed on the under side of a mixing bowl 24. The bowl is preferably elliptical in shape so as to permit of a reciprocating movement in an horizontal plane of the folding element, hereinafter described in detail and is provided with the detents mentioned for the purpose of preventing the bowl from being accidentally moved from the platform 20 by vibration or other cause during the folding process. Rising from the center of one of the rear edges of the platform 20 is a rectangular standard 25 provided in one of its side faces with a plurality of notches 26, the standard being receptive of a handle 27, having a rectangular bore, carrying a U-shaped frame 28. Pivoted at 29 to the outer surface of one of the legs of the frame 28 is a latch member 30 which is adapted to cooperate with any one of the notches 26 so as to support the folding attachment, hereinafter referred to, at a certain definite height within the bowl 24, all as more clearly shown in Figs. 1, 8 and 9 of the drawings. The opposite end of the latch 30 has pivoted thereto at 31 an operating member 32 having a lug 33 formed at one end thereof and adapted to cooperate with the edge 34 of the latch 30 for opening the same or disengaging the same from the notches 26. The operating member 32 is also provided with a thumb-engaging portion 35 and a standard-engaging portion 36. Normally, the latch 30 and the operating member 32 are in the position shown in Fig. 9 of the drawings and are maintained in such position by means of a tension spring 37, one end of which is fixed at 38 to the operating member 32, and the other end of which is fixed at 39 to an arm 40 formed on the latch 30. Thus, when it is desired to raise, lower, or remove the motor, shortly to be described, from the standard 25, the handle 27 is gripped in the hand of the operator, and the operating member 32 is moved outwardly by the thumb of the operator's hand so as to pivot the operating member 32 with respect to the latch 30 until the lug 33 engages the edge 34 of the latch. This continued movement of the operating member 32 against the action of the spring 37, causes the latch 30 to pivot outwardly about point 29 so as to become disengaged from the notch 26 with which it was associated. At that time, the handle 27 is free to slide along the standard 25.

Carried by the frame 28 is an electric motor 41 on the casing of which there may be fixed a control box 42, which includes a rheostat (shown diagrammatically in Fig. 10 of the drawings) and an operating lever 43 operable in the slot 44 of the box. The box may bear certain legends such as "Slow", "Fast", and "Off", it being desirable to operate certain of the attachments of the present invention at a slow rate of speed and others at a faster rate of speed.

In order that the various attachments of the present invention may readily be engaged with the motor so as to be driven by the same, I provide a "Universal" coupling arrangement which is exceedingly simple in construction and speedily operated to connect or disconnect any one of the various attachments constituting the aforesaid illustrative embodiments of the present invention. While not limited thereto, I prefer to utilize the coupling means shown in the accompanying drawings and consisting of a cylindrical extension 45 formed with the casing of the motor 41 and having on its outer periphery threads 46 adapted to receive an internally threaded collar 47 having an inwardly directed flange 48 by means of which the collar may be permanently attached to the particular attachment, the one under discussion being the folding attachment and being generally designated by the reference character 49. In order to prevent any one of the attachments of the present invention from being wrongly connected to the motor 41, I provide the cylindrical extension 45 with a conical extension 50 of reduced diameter, which, in turn, I provide with a flat 51 adapted to cooperate with the corresponding flat 52 formed in a collar 53 which supports the attachment 49. The collar 53 is provided with an outwardly directed flange 54 adapted to cooperate with the flange 48 of the collar 47 to retain the attachment 49 in operative position.

The attachment 49 preferably includes a substantially triangular casing 55 provided with a cover plate 56, the latter being held in place by means of screws 57 engageable in lugs 58 formed on the casing 55. All of the operative parts of this attachment are adapted to be sealed within the casing 55, the arrangement being such that once the cover plate be closed, it need not be necessary to ever open the same again for the reason that the casing 55 is adapted to contain a lubricant for all of the moving parts of the attachment.

Formed in the casing 55 are bosses 59 in which there are secured bearings 60 for a shaft 61. The upper end of the shaft 61 is provided with the reduced portion 62 adapted to cooperate with the similarly shaped portion 63 formed on the shaft 64 of the motor 41. Fixed upon the shaft 61 intermediate the bosses 59 is a worm drive 65 meshing with the worm wheel 66 rotatably mounted on the bolt 67 threadedly engaged in a boss 68 formed in the casing 55. Carried by one of the surfaces of the worm wheel 66, near the outer periphery thereof, is an eccentric pin 66', operatively engaged in an elongated slot 68' formed in a lever 69, fixed upon a short shaft 70 journaled in bosses 71 and 72 formed, respectively, in the casing 55 and cover plate 56. The lever 69 is guided by means of a shoe 73 carried at the outer end thereof and adapted to cooperate with a track 74 formed within the casing 55.

The shaft 70 extends beyond the bearing 72 and is provided with the square shank 75 over which fits a collar 76 formed on the upper end of a bar or lever 77, the collar 76 being retained on the shank 75 by means of a wing screw 78 engageable within a threaded socket formed in the shank 75.

The lower end of the bar or lever 77 is adapted to carry a folding member 79 consisting of a plurality of substantially U-shaped wires 80, the free ends of which are anchored in a support 81 which is carried by the lever or arm 77 by means of the adjustable screw 82.

This completes the description of the folding attachment constituting one of the aforesaid illustrative embodiments of the present invention. While the mode of use and operation thereof are believed to be clearly apparent from the foregoing description, the same may be briefly summarized as follows:

By way of example, I shall set forth a recipe for making an orange sponge cake. The ingredients necessary are:
8 eggs
1⅓ cups of sugar which has been sifted 8 times
1 cup of cake flour which has been sifted 8 times
juice and rind of 1 orange
1 teaspoonful of cream of tartar.

First, the yolks are beaten, preferably, but not necessarily, with the automatic beater which I shall later describe and which constitutes another one of the aforesaid illustrative embodiments of the present invention. During this process, the sugar is gradually added and the juice and rind of the orange are gradually added. Then the whites of the eggs are half whipped, also by means of the beater hereinafter referred to, and thereafter the cream of tartar is added to the half whipped whites and the whipping continued until the mixture is stiff and stands in peaks. The mixture of the whites and the cream of tartar is then added to the yolk mixture by folding in the same slowly and carefully by means of the folding attachment at present under discussion. Thereafter, the flour is added to the mixture and this too is slowly folded in with the folding attachment at present under discussion. As soon as this operation has been completed, the batter is complete and the cake may be baked in an ungreased tube pan in a slow oven at 325° F. for approximately an hour and a half. As soon as the baking is finished, the pan should be inverted until the cake is cold.

When it is desired to carry out the folding steps just referred to, the attachment 49 is connected to the motor 41 by engaging the collar 47 with the threaded extension 45 of the casing of the motor. The mixture is, of course, in the bowl 24 and the height of the motor is adjusted so that the folding member 79 will, at the top of its recovery motion, be outside of the batter. The control lever 43 of the box 42 is then moved to the "Slow" station of the rheostat so as to operate the motor 41. The rotation of the motor shaft 64 rotates the shaft 61 which, because of the connection between the worm drive 65 and worm wheel 66 rotates the latter about the bolt 67. The eccentric pin 66', which is carried by the worm wheel 66 will then reciprocate within the slot 68' of the bar or lever 69 which movement will cause the bar or lever to rock the shaft 70. The rocking of the shaft 70 imparts a reciprocating motion to the bar or arm 77 so as to cause the folding member 79 to enter the batter and move through the same in a horizontal plane and recover in a similar plane at a lesser rate of speed. As stated, when the end of the recovery movement is reached, the folding member should be outside of the batter.

This completes the description of the mode of operation and use of the folding attachment constituting one of the aforesaid illustrative embodiments of the present invention. I have found that by using such an attachment, the air cells of the batter are not disturbed during the adding of the yolks and flour, with the result that the final cake is of soft, fine grain, and of delicate texture.

Referring now to the illustrative embodiment of the present invention shown in Fig. 7 of the drawings, I have there shown a mixing attachment consisting of a collar 47' similar in all respects to the collar 47 by means of which a casing 83 may be attached to the motor casing, the casing 83 containing a mechanism by means of which the same may be rotated with the shaft of the motor as the central point of rotation. The casing also contains mechanism for simultaneously rotating a shaft 84 carrying at the lower end thereof a mixing member 85. The arrangement is such that the mixing member 85 not only rotates upon its own axis, but also rotates about the shaft of the motor. This attachment may be used for any kind of mixing where it is not necessary for the ingredients to be finally admixed nor to have any special type of mixing as is the case when preparing the batters of cakes.

Referring now to the aforesaid illustrative embodiment of the present invention shown in Figs. 11 and 12 of the drawings, I have there shown, in place of the folding attachment 49, a mixing and beating attachment 86, it being the function of this attachment to mix the ingredients of ice cream and mousse mixtures. I have found that in order that such mixtures result in a final frozen food product of rich, smooth, creamy consistency, it is necessary to mix the ingredients with what may be called an elliptical motion in a horizontal plane. This motion may be obtained by means of the mechanism shown in Figs. 11 and 12 wherein the numeral 87 designates a casing in which there is journaled a shaft 88. Carried by the shaft is a pinion 89, meshing with a beveled gear 90 rotatably mounted upon the bolt 91 anchored in the casing. The outer periphery of the gear 90 has fixed thereto a lug 92 pivotally carrying at 93 a rod 94. The rod 94 is slidable in a bushing 95 about which the rod is also pivoted. At the lower end of the rod there is carried a mixing and beating element 96 consisting of an elliptical frame 97 and a plurality of coiled wires 98 carried by the frame and disposed in parallel relation to each other. The rotation of the motor shaft causes the beveled gear 90 to rotate, which, in turn, rotates the lug 92. Such rotation causes the bushing 95 to be rocked, thus imparting a rocking movement to the beater member 96 and inasmuch as the rod 94 is slidable in the bushing 95, the beater element is rotated in a horizontal plane through an ellipse. The dot and dash line shown in Fig. 12 of the drawings clearly indicates the path taken by the beater member 96 during this operation.

In Fig. 13 of the drawings I have shown the adaptability of the present invention to that type of beater commonly known as the "Dover" beater and in Fig. 14 I have shown the manner in which the present invention may be applied to a juice extractor. It will be noted that in this latter embodiment, the motor is reversed in its position upon the standard 25.

This completes the description of the remaining illustrative embodiments of the apparatuses of the present invention. It is believed that the mode of operation and use of these remaining embodiments will be clearly understood from the foregoing description and corresponding figures, so that the same need not be gone into in detail here.

It will be noted that the aforesaid illustrative embodiments of the present invention are simple in construction, easy and economical to fabricate and assemble and admirably adapted to perform their intended functions as heretofore set forth.

Other advantages and superiorities of the devices of the present invention will be readily apparent to those skilled in the art to which the present invention relates.

I claim:

1. In a device of the class described, in combination, an electric motor, a folding member, and means driven by said electric motor to slowly reciprocate said folding member at a predetermined rate of speed in its effective movement and at a lesser rate of speed in its recovery, said means including a pivoted bar carrying said folding member at one end thereof, a shoe carried by said bar, a track engageable by said shoe to guide said bar, and means actuated by said electric motor and cooperating with said pivoted bar to rock the latter about its point of support.

2. In a device of the class described, in combination, an electric motor, a folding member, and means driven by said electric motor to impart a slow reciprocating motion to said folding member, said means including a pivoted bar having an elongated slot at one end and carrying said folding member at the other end thereof, a shoe carried by said bar, a track engageable by said shoe to guide said bar, and eccentric means actuated by said electric motor and cooperating with the elongated slot of said pivoted bar to rock the latter about its point of support.

3. In a device of the class described, in combination, an electric motor, a folding member, and means driven by said electric motor to slowly reciprocate said folding member at a predetermined rate of speed in its effective movement and at a lesser rate of speed in its recovery, said means including a pivoted bar having an elongated slot at one end and carrying said folding member at the other end thereof, a shoe carried by said bar, a track engageable by said shoe to guide said bar, and eccentric means actuated by said electric motor and cooperating with the elongated slot of said pivoted bar to rock the latter about its point of support.

In testimony whereof, I have signed my name to this specification this 4th day of August, 1931.

HYMAN JACKMAN.